(12) United States Patent
Yoon et al.

(10) Patent No.: US 8,588,145 B2
(45) Date of Patent: Nov. 19, 2013

(54) METHOD FOR ALLOCATING AND ACCESSING RADIO RESOURCES IN OFDMA SYSTEM

(75) Inventors: Chul-Sik Yoon, Daejeon (KR); Soon-Yong Lim, Daejeon (KR); Jae-Heung Kim, Daejeon (KR); Kun-Min Yeo, Daejeon (KR); Byung-Han Ryu, Daejeon (KR)

(73) Assignees: Electronics and Telecommunications Research Institute (KR); Samsung Electronics Co., Ltd. (KR); KT Corporation (KR); SK Telecom Co., Ltd. (KR); KTFreetel Co., Ltd. (KR); Hanaro Telecom., Inc. (KR)

( * ) Notice: Subject to any disclaimer, the term of this patent is extended or adjusted under 35 U.S.C. 154(b) by 1006 days.

(21) Appl. No.: 10/581,425

(22) PCT Filed: Dec. 2, 2004

(86) PCT No.: PCT/KR2004/003152
§ 371 (c)(1), (2), (4) Date: Jun. 16, 2008

(87) PCT Pub. No.: WO2005/055437
PCT Pub. Date: Jun. 16, 2005

(65) Prior Publication Data
US 2008/0240022 A1    Oct. 2, 2008

(30) Foreign Application Priority Data

Dec. 2, 2003 (KR) .................. 10-2003-0086683
Nov. 12, 2004 (KR) .................. 10-2004-0092535

(51) Int. Cl.
*H04W 4/00* (2009.01)
*H04W 72/00* (2009.01)

(52) U.S. Cl.
USPC ............................ 370/329; 370/330; 455/450

(58) Field of Classification Search
USPC ............... 370/329, 330; 455/450, 451, 452.1, 455/464, 509
See application file for complete search history.

(56) References Cited

U.S. PATENT DOCUMENTS

2003/0176161 A1 * 9/2003 Dale et al. .................... 455/3.01
2004/0190482 A1 * 9/2004 Baum et al. .................. 370/347

FOREIGN PATENT DOCUMENTS

| DE | 198 00 953 | 1/1998 |
| KR | 10-2003-0064219 | 7/2003 |
| WO | WO 02/33848 | 4/2002 |

* cited by examiner

*Primary Examiner* — Kent Chang
*Assistant Examiner* — Chayce Bibbee
(74) *Attorney, Agent, or Firm* — The Farrell Law Firm, P.C.

(57) ABSTRACT

Disclosed is a method for allocating and accessing downlink resources in the OFDMA communication system. In the resource allocation method, bursts having the same modulation and channel encoding level are arranged in a predetermined temporal order on a physical layer. Information on the allocated unit resources is included in a common control block and is transmitted to a subscriber station, and the subscriber station then detects a number of the allocated unit resources to thus check the range of bursts to be received by the subscriber station. Therefore, power consumption by the subscriber station is reduced and signaling overheads of the common control information and unneeded residual resources are decreased.

7 Claims, 10 Drawing Sheets

METHOD FOR ALLOCATING AND ACCESSING RADIO RESOURCES IN OFDMA SYSTEM

TECHNICAL FIELD

The present invention relates to an efficient resource allocation method in an orthogonal frequency division multiple access (OFDMA)-based wireless portable Internet system. More specifically, the present invention relates to a resource allocation method for saving power consumption of a subscriber station and reducing overheads and residual resources in an OFDM system.

BACKGROUND ART

The wireless portable Internet system for further supporting mobility of a subscriber station to the wireless data communication system based on fixed access points such as the wireless LAN has recently been developed.

The IEEE 802.16 standard has adopted the OFDMA for a communication method if physical layers.

The OFDMA, which is an OFDM-FDMA communication method precisely, uses a plurality of subcarriers as a plurality of subchannels, and the wireless portable Internet system transmits with the same modulation level and channel coding scheme as a single burst, differing from the OFDM-TDMA system which transmits data to a subscriber station for each time slot. For ease of description, the OFDM-FDMA will be referred to as an OFDMA system hereinafter in an exemplary embodiment of the present invention. The OFDMA system is resistant against the fading generated by multipaths, and supports high data rates.

FIG. 1 shows a single-carrier resource allocation scheme.

As shown, a base station transmits data only to a single mobile station in the same symbol interval in the downlink according to the single carrier method, in which the symbol interval can be represented as a time slot. The base station uses predetermined burst profiles (including combinations of modulation methods and coding schemes) to arrange the burst profiles in the order from the most robust burst profile to the least robust one, and transmits the arranged burst profiles. Therefore, the subscriber station receives the bursts up to its operational burst profile, and ignores subsequent bursts having less robust burst profiles, thus minimizing power consumption caused by not processing the subsequent bursts. The OFDM-TDMA scheme follows the above-described power saving process for the plural carriers.

However, the OFDMA applied to the wireless portable Internet system allows the data to be transmitted to a plurality of subscriber stations in the same symbol period, and hence, the subscriber station must receive undesired bursts even though the received bursts are less robust burst profiles than that of the operational burst profile.

An OFDM communication scheme of the conventional wireless portable Internet system will be described.

FIG. 2 shows a hierarchical diagram of the IEEE 820.16 wireless portable Internet system including a physical layer L10 and media access control (MAC) layers L21, L22, and L23.

The physical layer L10 performs a wireless communication function such as modulation/demodulation, coding/decoding, etc. as performed by a normal physical layer. According to the IEEE 802.16e, the wireless portable Internet system does not have function-specific MAC layers as a wired Internet system, but a single MAC layer in charge of different functions. The MAC layer includes a privacy sublayer L21, a MAC common part sublayer L22, and a service specific convergence sublayer L23.

The service specific convergence sublayer L23 performs payload header suppression and QoS mapping functions in consecutive data communication.

The MAC common part sublayer L22 is the core of the MAC layer which is in charge of system access, bandwidth allocation, connection establishment and maintenance, and QoS control. The privacy sublayer L21 performs functions of equipment authentication and security key exchange, and encryption. The device authentication is carried on by the privacy sublayer L21, and the user authentication by an upper layer of the MAC (not illustrated).

FIG. 3 shows a schematic of a connection structure between a base station and a subscriber station in the wireless portable Internet system. A connection is provided between the MAC layers of the subscriber station (SS) and the base station (BS.) The term "connection C1" as used herein does not refer to a physical connection but a logical connection that is defined as a mapping relationship between the MAC peers of the subscriber station SS and the base station BS for tragic transmission of one service flow.

Hence, the parameter/message as defined on the connection C1 refers to a function executed between the MAC peers. Actually, the parameter/message is processed into a frame, which is transferred through the physical layer and analyzed so as to enable the MAC layer to execute the function corresponding to the parameter/message.

The frames representing radio resources allocated by the OFDMA scheme include a downlink sub-frame and an uplink sub-frame.

FIG. 4 shows a frame diagram for resource allocation in a downlink of the conventional OFDMA system.

A downlink subframe includes a downlink DL) frame prefix, MAP information, and a plurality d bursts. In the frame diagram, the ordinate axis represents sub-channels comprising orthogonal frequencies while the abscissa axis represents the time-divided symbol axis. The downlink bursts form a 2-dimensional square with respect to the symbol and sub-channel axes. The MAP information has common control information including burst profile information, such as modulation and channel coding information, and the offset information, such as subchannel offsets and symbol offsets of burst to be received by the subscriber station.

As to the DL Burst #N, the less the number of N becomes, the more robust burst it is. That is, DL Burst #3 is more robust than DL Burst #4 and less robust than DL Burst #2.

Regarding to resource allocation method shown in FIG. 4, since the resource is allocated as an additional 2-dimensional square format for each burst, it frequently occurs that the more robust bursts are allocated until a later time. For example, DL Burst #2 and DL Burst #3 are transmitted until the later time in the temporal manner compared to DL Burst #4 and DL Burst #5.

Therefore, even when the subscriber station knows what bursts to receive (e.g., DL Burst #2), the subscriber station must receive other bursts that have less robust burst profiles (e.g., DL Burst #3, DL Burst #4, and DL Burst #5) in order to receive the burst to which the subscriber belongs, thereby generating undesired power consumption.

Also, the receiver processes DL Burst #2 later than DL Burst #4, and therefore, DL Burst #2 and DL Burst #4 may be transmitted to the upper layer in the wrong order. The burst which reaches a temporally subsequent symbol interval has a delayed processing time, and a corresponding response is accordingly delayed.

Further, since the resource is divided into non-uniform squares in the prior art, it may be possible that all the resources are not allocated and some resources remain.

FIG. 5 shows a conventional method for processing downlink resources for power saving.

A pipeline delay for default processing (which is a minimum processing time for the DL-MAP) is inevitable because of features of the OFDMA physical layers, the fast Fourier transform (FFT) is only performed during the pipeline delay, and the subsequent stages including demapping and channel decoding are difficult to execute.

As to managing the power saving, the subscriber station is controlled to process desired bursts and turn off the receiver when subsequent bursts are provided, thereby saving the power.

A designated burst (D-burst) may be allocated at a later time in the conventional resource allocation method shown in FIG. 4. That is, the burst which is less robust than the designated burst may be allocated prior to or concurrently with the designated burst.

Therefore, unnecessary bursts are also received while the designated burst is decoded, which is inefficient in the viewpoint of power saving. That is, further power is consumed for a useless process since the subscriber station receives bursts which are less robust than the general operational burst profile.

In addition, a surplus resource may be generated since the resources are allocated in the 2-dimensional square format in the prior art, and overhead may be larger since information on each burst in the MAP has symbol offset information and subchannel offset information.

DISCLOSURE OF INVENTION

Technical Problem

It is an advantage of the present invention to provide a resource allocation method for saving power consumption used for processing undesired bursts in an OFDM system.

It is an advantage of the present invention to provide a resource allocation method for using minimum signaling overheads to the MAP (Frame Configuration) Information which is a broadcast signaling. And, it is better to save power of a subscriber station and minimize residual resources by using the remaining resources as sequentially.

Technical Solution

In one aspect of the present invention, a method for allocating a downlink radio resource in an orthogonal frequency division multiple access (OFDMA) communication system, comprises: (a) obtaining a characteristic of a radio channel; (b) determining a modulation and channel coding level; (c) allocating a radio resource according to a temporal order predefined to bursts corresponding to the determined modulation and channel coding level; (d) generating information on the allocated radio resource and mapping the information to a common control block; and (e) transmitting the allocated radio resource in a downlink.

The information on the radio resource is allocated to the burst by the number of the unit resources. The unit resource is generally called by a slot (DL or UL slot) which is a predetermined symbol interval times a predetermined number of subchannels. The resource allocation is performed as the same order of the common control information (MAP information), and therefore, the currently allocated resources are started from the last resource of the previous one.

The radio resources are sequentially allocated in the order of subchannels in the same symbol axis by unit resource. After filling up all the remaining subchannels in the same symbol axis, the next configuring unit resource starts from the first subchannel in the next corresponding symbols axis. (If the unit resource comprises one subchannel by three symbols, then the next corresponding symbol is next to the third symbol.) Therefore, the more robust bursts are started in the less symbol and subchannel index.

In another aspect of the present invention, a method for a subscriber station to access a radio resource in an orthogonal frequency division multiple access (OFDMA) communication system, comprises: (a) retrieving designated burst information in a common control block (MAP information); (b) checking the number of unit resources allocated to the designated burst from the designated burst information; (c) retrieving the designated burst based on the number of the allocated unit resources previously allocated in the common control block (MAP information), and receiving the designated burst; and (d) terminating the receiving operation when the designated burst is received.

ADVANTAGEOUS EFFECTS

According to the present invention, the subscriber station in the OFDM system saves power consumption used for processing unnecessary bursts.

Also, the resource allocation method according to the present invention uses minimum overheads and minimizes residual resources.

BRIEF DESCRIPTION OF THE DRAWINGS

The accompanying drawings, which are incorporated in and constitute a part of the specification, illustrate an embodiment of the invention, and, together with the description, serve to explain the principles of the invention.

BEST MODE FOR CARRYING OUT THE INVENTION

Figure 1:
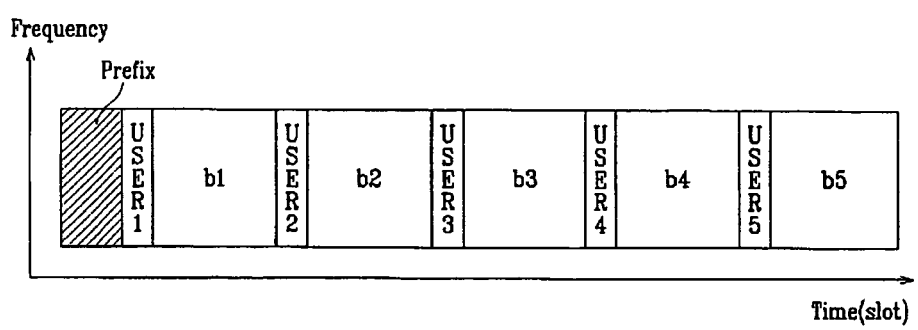
FIG. 1 shows a single-carrier resource allocation scheme.
Figure 2:
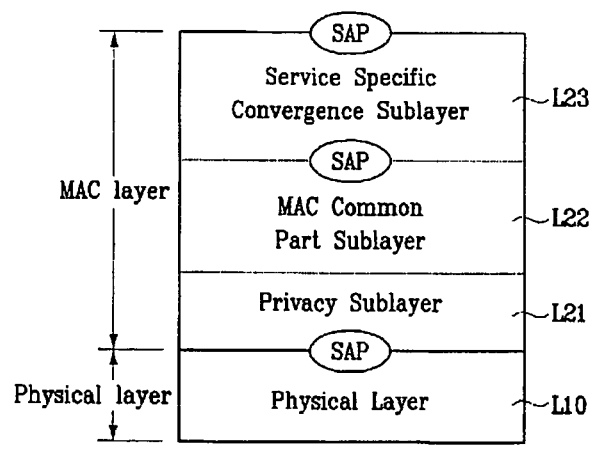
FIG. 2 shows a hierarchical structure of the wireless portable Internet system.
Figure 3:
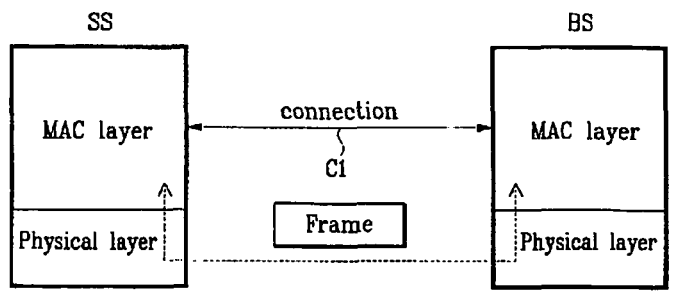
FIG. 3 shows a connection state between a subscriber station (SS) and a base station (BS) in the wireless portable Internet system.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A radio resource allocation method according to an exemplary embodiment of the present invention will be described with reference to drawings.

Figure 6:
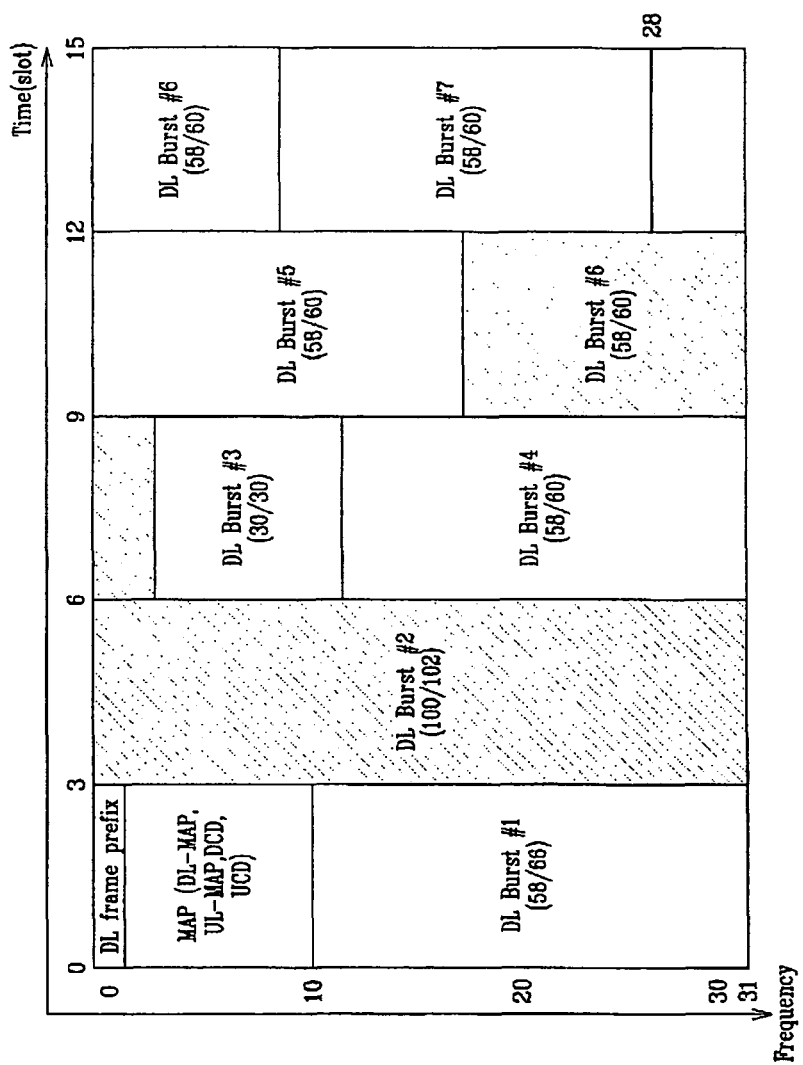
FIGS. 6 and 7 show radio resource allocation according to an exemplary embodiment of the present invention.
Figure 7:
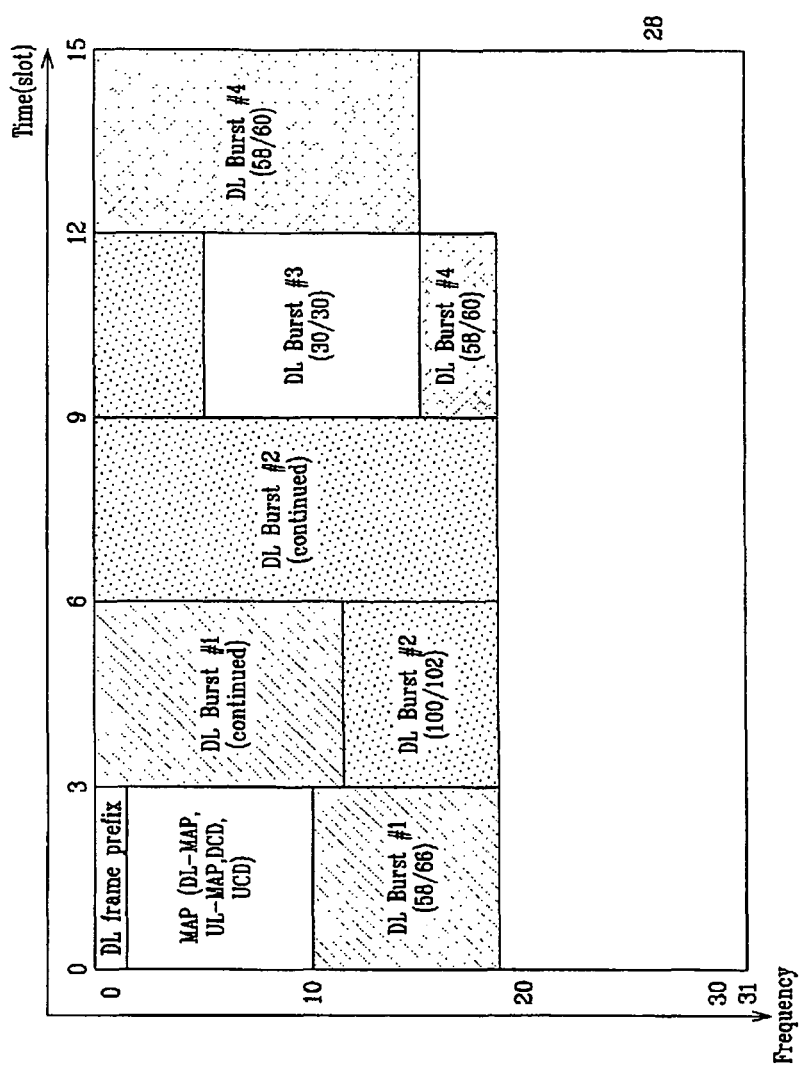

FIGS. 6 and 7 show radio resource allocation according to an exemplary embodiment of the present invention.

Figure 4:
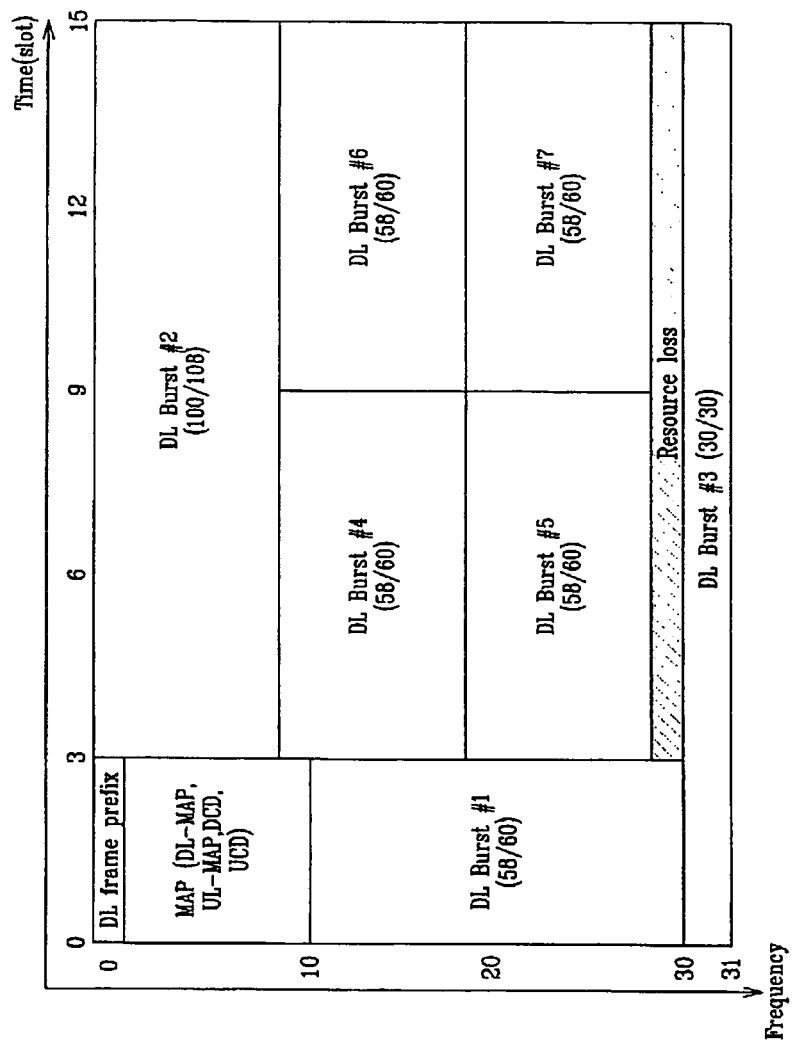
FIG. 4 shows a frame structure for resource allocation in a downlink of the conventional OFDMA system.
Figure 5:
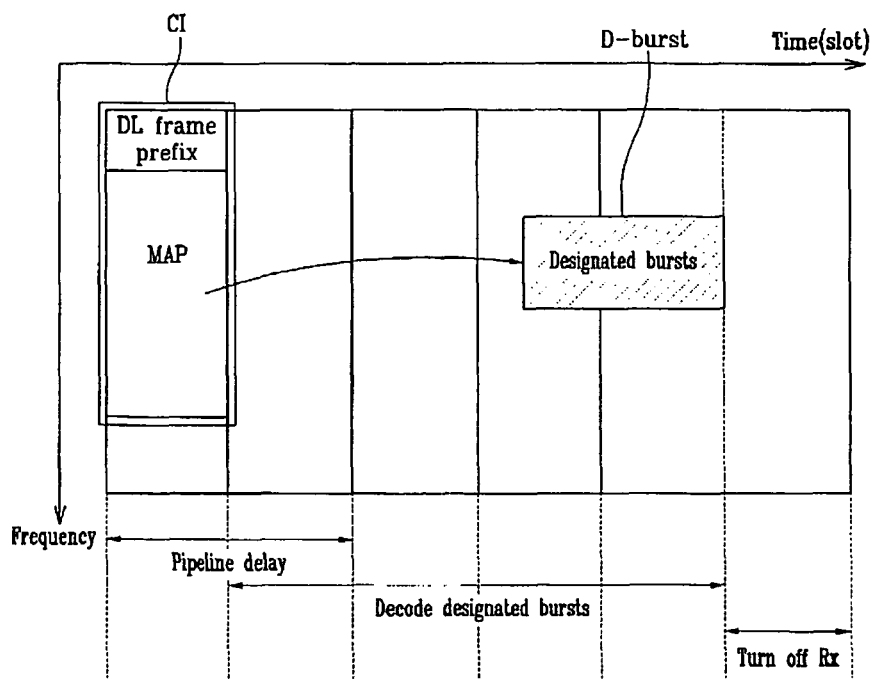
FIG. 5 shows a conventional method for processing downlink resources for power saving.

As to resource allocation according to an exemplary embodiment of the present invention, the bursts are arranged sequentially according to a specific rule. (The burst of starting from the less symbol index is the more robust one, and the burst started from the less subchannel index in each burst d starting from the same symbol index is the more robust one.) When compared to the bursts illustrated in FIG. 4, a burst shown in FIGS. 6 and 7 is not always configured to be a 2-dimensional square. That is, when subchannels of a burst are allocated in the same symbol interval, residual subchannels are contiguously allocated in the next symbol interval. The bursts are allocated in the order of from the most robust burst to the least robust one with respect to the time axis.

The subscriber station checks bursts to be received by the subscriber station when the number of unit resources allocated to the bursts is designated and allocated after the last resource of the previously allocated bursts.

For example, in FIG. 6, there are five slot groups having thirty-two subchannels by three symbols. When one subchannel by three symbol intervals is designated to be a unit resource, a total of 160 (=32×5) unit resources are provided. In this instance, twenty two unit resources are allocated to DL Burst #1, corresponding to eleventh to thirty-second unit resources.

Therefore, when receiving information to receive the unit resources up to the thirty-second unit resource from the base station, the subscriber station designated to receive DL Burst #1 receives no further undesired bursts.

When the base station attempts to provide further accurate position information on a designated burst to the subscriber station, the base station further provides a start index of the unit resource and an end index of the unit resource to the subscriber station only by designating the allocated number of unit resources.

The subscriber station then reads the number of unit resources and the order thereof from MAP information to thus catch bursts to be received and a symbol, and reduce overheads for displaying burst information.

FIG. 7 shows a frame for partially allocating the subchannels. When the system performs the resource allocating by using partial allocation on the total number of downlink subchannels, the same allocation scheme can be used by broadcasting the size information on the common control information, that is, number information of subchannels in use (partial loading factor) to the above-described resource allocation method.

Hence, the information on the number of subchannels in use and information on unit resources in use are obtained from the common control information. Indexing information on DL Burst is produced by using a value generated by multiplying the partial loading factor to the total number of subchannels.

The resource allocation method of FIG. 7 substantially corresponds to that of FIG. 6 except the reduced number of available subchannels.

An unused radio resource is saved according to the resource allocation method of FIG. 7, adjacent cell interference is reduced since some subcarriers are not used, and hence, the burst profile with better transmission efficiency is used.

When comparing the exemplary embodiment to the conventional resource allocation method in the 2-D square format, the exemplary embodiment generates the residual resource equal to or less than that of the prior art in the case of transmitting the same bursts.

Figure 8:
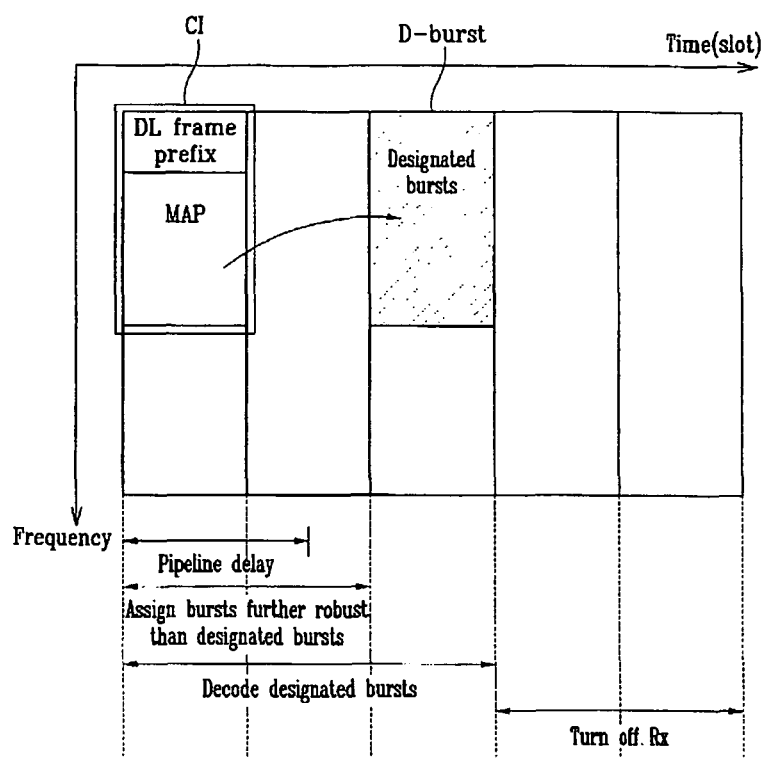
FIG. 8 shows a method for processing downlink resources for power saving according to an exemplary embodiment of the present invention.

FIG. 8 shows a method for processing downlink resources for power saving according to an exemplary embodiment of the present invention.

The resource allocation methods shown in FIGS. 6 and 7 follow the strict order of from the more robust burst to the less robust burst. When the base station determines that a corresponding frame has sufficient resources, the base station transmits data with more robust bursts to the subscriber station, and when the subscriber station detects a burst to be received by the subscriber station, the subscriber station processes the corresponding burst and does not process bursts in the subsequent symbol interval, and therefore, the subscriber station saves more power.

In the exemplary embodiment, data to be transmitted to a plurality of subscriber stations having the same modulation and channel encoding level are combined to one burst and the combined data are transmitted thereto, and in addition, it is also possible to combine one burst to data to be transmitted to one subscriber station. The subscriber station retrieves a designated burst to be received by the subscriber station from the MAP information, receives the designated burst, and turns off the receiver so as to not process the bursts to be provided in the subsequent symbol interval. It is optimal to discard the burst transmitted by using a transmission scheme which is more efficient than the operational burst profile instead of receiving the burst since the corresponding subscriber station cannot normally receive the burst.

When the unit resources are designated, the designated burst can be easily retrieved through the number information of unit resources.

Figure 9:
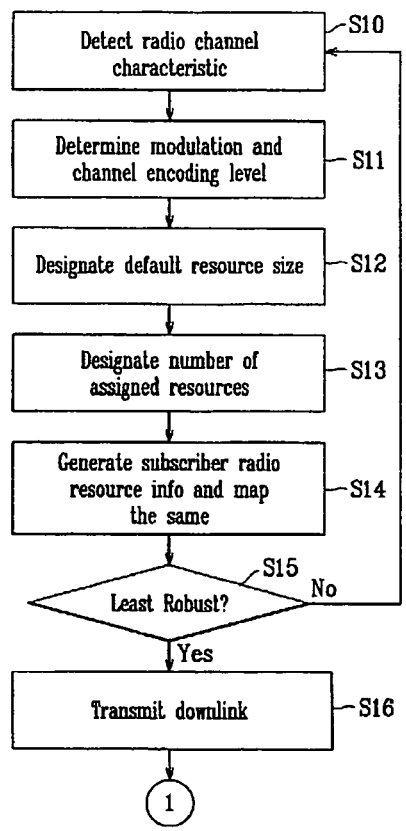
FIG. 9 shows a flowchart for allocating radio resources in a downlink according to an exemplary embodiment of the present invention.

FIG. 9 shows a flowchart for allocating radio resources in a downlink according to an exemplary embodiment of the present invention.

In order to perform a downlink communication, the initial base station receives a characteristic of a radio channel in step of S10 through an MAC message (e.g., a channel descriptor message) which describes characteristics of physical layers.

The base station adaptively determines a modulation and channel encoding level according to the characteristic of the radio channel reported from the MAC message (or PHY channel CQI report) in step of S11. For example, the base station determines a corresponding modulation and channel encoding level according to a signal-to-noise ratio (SNR) detected from the physical layer.

Radio resources are allocated as allows when the modulation and channel encoding level is determined. The size of the default resource to be used is designated in step of S12 by designating the number of unit resources used for a downlink, and the step of S12 is omitted when the previously designated default resource information (including unit resources and the partial loading factor) is used.

The number of unit resources allocated to the burst is designated in step of S13 since the unit resources have a constant symbol interval.

When attempting to provide further accurate designated burst information, a start index of the unit resource and an end index of the unit resource of the burst are designated.

When the radio resource is allocated, the number of the allocated unit resources and subscriber information are generated, and the generated number and subscriber information are mapped to a common control information block including MAP information in step of S14.

When the radio resource is allocated and the information is mapped to the block, it is determined whether the burst corresponding to the determined modulation and channel encoding level have the least robustness in step S15. When the base station transmits data in the order from the most robust burst to the subscriber station, the subscriber station receives no bursts which are less robust than the operational burst profile, and thereby, power is saved and the data are transmitted in the order of from the most robust burst from the downlink subframe.

When the allocation on the available radio resource is finished, the base station generates the radio resource into frames and performs downlink transmission in step of S16.

Figure 10:
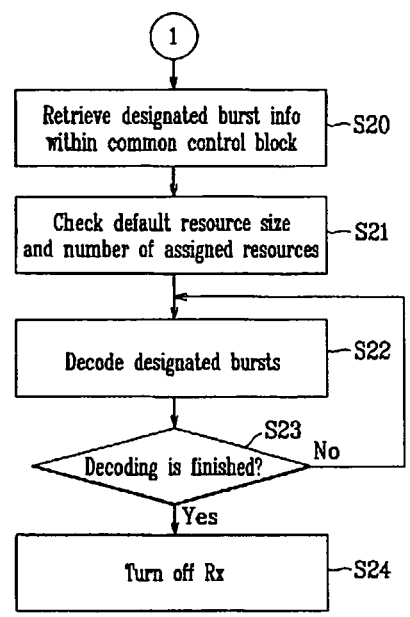
FIG. 10 shows a flowchart far receiving radio resources in a downlink according to an exemplary embodiment of the present invention.

FIG. 10 shows a flowchart for receiving radio resources in a downlink according to an exemplary embodiment of the present invention.

The subscriber station retrieves designated burst information in the common control block (including MAP information) transmitted as broadcast information, the burst information including modulation and channel modulation level information of bursts in step of S20.

The subscriber station checks the default resource information (such as the unit resource information and the partial loading factor), and the number of unit resources corresponding to bursts in step of S21, and checks no default resource size when the available subchannels are used. The subscriber station automatically calculates the range of the symbol interval in which the subscriber station will receive data, by checking the number of allocated unit resources, and thus obtains the position of bursts to be received by the subscriber station and symbol information.

When desiring to obtain a further accurate position of the designated burst, the subscriber station checks the start index of the unit resource and the end index of the unit resource of the burst, and demodulates or decodes the designated burst according to the checked modulation and channel encoding level in step S22. The subscriber station checks whether to have the burst up to the symbol of the designated burst to be received by the subscriber station decoded, and continues to decode the same when the decoding is not finished in step of S23.

When the decoding is finished, the receiver of the subscriber station is turned of in step S24 since it is useless to receive bursts which are less robust than the operational burst profile when the bursts are transmitted in the order of from the most robust burst. Accordingly, the subscriber station saves power used for receiving unnecessary bursts.

While this invention has been described in connection with what is presently considered to be the most practical and preferred embodiment, it is to be understood that the invention is not limited to the disclosed embodiments, but, on the contrary, is intended to cover various modifications an equivalent arrangements included within the spirit and scope of the appended claims.

The invention claimed is:

1. A method for allocating a radio resource by a base station, comprising:
   determining, by the base station, a default resource within the radio resource, wherein the radio resource includes a plurality of subchannels and a plurality of symbol intervals, and a size of the default resource is determined using a number of available subchannels from among the plurality of subchannels;
   dividing the default resource into a plurality of bursts that are arranged in time order according to robustness;
   designating a number of unit resources to be allocated to each of the plurality of bursts;
   adding, to a map, information on the number of the unit resources allocated to each of the plurality of bursts, at least one index of each of the plurality of bursts, information on an order of each of the plurality of bursts, and information on the size of the default resource, wherein the at least one index is based on the size of the default resource; and
   transmitting the map to a subscriber station.

2. The method of claim 1, wherein the at least one index includes an index of a start unit resource and an index of an end unit resource for each of the plurality of bursts.

3. The method of claim 1, further comprising:
   deciding a profile about the plurality of bursts;
   generating a frame by encoding and modulating the plurality of bursts according to the profile; and
   transmitting the frame including the map to the subscriber station.

4. A method for transmitting a frame by a base station, comprising:
   determining, by the base station, a default resource within the radio resource, wherein the radio resource includes a plurality of subchannels and a plurality of symbol intervals, and a size of the default resource is determined using a number of available subchannels from among the plurality of subchannels;
   inserting a plurality of bursts into the frame, wherein the default resource is divided into the plurality of bursts, the plurality of bursts are arranged in a time order on the frame according to robustness, a position of each of the plurality of bursts is determined by designating a number of unit resources to be allocated to each of the plurality of bursts;
   adding, to a map, information on the number of the unit resources allocated to each of the plurality of bursts, at least one index for each of the plurality of bursts, information on an order of each of the plurality of bursts, and information on the size of the default resource, wherein the at least one index is based on the size of the default resource;
   inserting the map into the frame; and
   transmitting the frame to a subscriber station.

5. The method of claim 4, further comprising:
   adding, to the map, information on a user identification corresponding to each of the plurality of bursts and information on a profile of each of the plurality of bursts.

6. A method for accessing a radio resource, by a subscriber station, that is formed by a plurality of subchannels and a plurality of symbol intervals, comprising:
   searching, by the subscriber station, information on a designated burst in a common control block,
      wherein the common control block includes information on a number of unit resources allocated to each of a plurality of bursts forming a default resource, at least one index for each of the plurality of bursts, information on an order of each of the plurality of bursts, and information on a size of a default resource, and
      wherein the at least one index is based on the size of the default resource, the default resource is at least partially included in the radio resource, and the size of the default resource is determined by a number of available subchannels from among the plurality of subchannels;

checking the number of the unit resources allocated to the designated burst and an order of the designated burst from the information on the designated burst;

searching the designated burst according the number of the unit resources to receive the designated burst, wherein the plurality of bursts are arranged in a time order on a frame according to robustness; and terminating a receiving operation, when the designated burst is received.

7. The method of claim 6, further comprising:

checking information on a profile of the designated burst from the information on the designated burst; and demodulating and decoding the designated burst according to the profile.

* * * * *